(12) United States Patent
Ho et al.

(10) Patent No.: US 7,611,650 B2
(45) Date of Patent: *Nov. 3, 2009

(54) NANOPOWDERS SYNTHESIS APPARATUS

(75) Inventors: Chi-Chuang Ho, Tu-Cheng (TW);
Chuan-De Huang, Tu-Cheng (TW);
Bor-Yuan Hsiao, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 615 days.

This patent is subject to a terminal disclaimer.

(21) Appl. No.: 11/432,422

(22) Filed: May 10, 2006

(65) Prior Publication Data
US 2007/0057390 A1 Mar. 15, 2007

(30) Foreign Application Priority Data
Sep. 14, 2005 (CN) .......................... 2005 1 0037335

(51) Int. Cl.
*B29B 9/00* (2006.01)
(52) U.S. Cl. .............................. 264/5; 264/13; 264/14; 425/6; 425/10; 977/896
(58) Field of Classification Search ........................ None
See application file for complete search history.

(56) References Cited

U.S. PATENT DOCUMENTS 6,787,231 B1 9/2004 Furman et al.
2006/0244164 A1* 11/2006 Didenko et al. ............... 264/14

FOREIGN PATENT DOCUMENTS

CN 1400044 A 3/2003

* cited by examiner

*Primary Examiner*—Mary Lynn F Theisen
(74) *Attorney, Agent, or Firm*—Frank R. Niranjan

(57) ABSTRACT

A nanopowders synthesis apparatus includes a reaction chamber, the reaction chamber having a top portion, a bottom portion opposite to the top portion, a sidewall adjoining the top and the bottom portion, and an inlet and an outlet; a first sprayer formed in the sidewall configured for spraying a first reactant into the reaction chamber therefrom; and a second sprayer formed in the bottom portion configured for spraying a second reactant into the reaction chamber therefrom. The inlet formed in the top portion configured for injecting a liquid medium, and the outlet formed in the bottom portion configured for releasing the liquid medium. A nanopowders synthesis method is also provided.

10 Claims, 2 Drawing Sheets

NANOPOWDERS SYNTHESIS APPARATUS

CROSS REFERENCE

This application is related to a co-pending U.S. Patent Application, entitled "APPARATUS AND METHOD FOR MAKING NANOPOWDER," filed on Jul. 25, 2006 with application Ser. No. 11/309,311, and to another co-pending U.S. patent application, entitled "NANOPOWDERS SYNTHESIS APPARATUS AND METHOD," filed on May 10, 2006 with application Ser. No. 11/432,207. Such two applications have the same inventors and assignee as the present application. The disclosures of the two applications are incorporated by reference herein.

TECHNICAL FIELD

The present invention relates to nanopowder synthesis apparatus and method, and more particularly to a nanopowder synthesis apparatus and a method for synthesizing nanopowders using the apparatus.

BACKGROUND

Nanomaterials can be divided into four categories as nanopowders, nanofibers, nanofilms and nanoblocks. Nanofilms and nanoblocks are generally formed by nanopowders. Therefore, the synthesis of nanopowders is very important. Synthesis techniques for nanopowders can be generally divided into vapor deposition methods and liquid deposition methods. Vapor deposition methods can be used to form high-purity nanopowders. However, vapor deposition methods have relatively low production capabilities and require high energy consumptions, and thereby are seldom used. Among liquid deposition methods, a typical precipitation reaction method is widely used. The precipitation reaction method is advantageous to accurately control composition of a compound during processing, can achieve uniform mixing at the atomic or molecular level, and can be employed for synthesizing particles of single composition or multi-constituent compounds.

However, the precipitation reaction method is generally accomplished in an agitator tank or a stirred-tank reactor. In the agitator tank or the stirred-tank reactor, precipitation reactions cannot react substantially, and utilization ratios of reactants are relatively low. In addition, sizes of particles are relatively big, liquid-liquid mixings on the micro level cannot be mixed uniformly. Nanopowders cannot disperse uniformly and are prone to be congregated, which results big particle sizes of the nanopowders.

What is needed, therefore, is a nanopowder synthesis apparatus which synthesizes super-minute nanopowders.

What is also needed, therefore, is a nanopowder synthesis method which synthesizes super-minute nanopowders.

SUMMARY

In a preferred embodiment, a nanopowder synthesis apparatus includes a reaction chamber, the reaction chamber having a top portion, a bottom portion opposite to the top, a sidewall adjoining the top and the bottom portion, and an inlet and an outlet; a first sprayer formed in the sidewall configured for spraying a first reactant into the reaction chamber therefrom; and a second sprayer formed in the bottom portion configured for spraying a second reactant into the reaction chamber therefrom. The inlet formed in the top portion configured for injecting a liquid medium, and the outlet formed in the bottom portion configured for releasing the liquid medium.

In another preferred embodiment, a nanopowder synthesis method includes the steps of providing a reaction chamber, the reaction chamber having a top portion, a bottom portion opposite to the top portion, a sidewall adjoining the top portion and the bottom portion, and an inlet and an outlet configured in the top portion and the bottom portion respectively; providing a first sprayer and a second sprayer formed in the sidewall and the bottom portion respectively; spraying a first reactant into the reaction chamber from the first sprayer; spraying a second reactant into the reaction chamber from the second sprayer to react with the first reactant; collecting products of reaction from the outlet by injecting a liquid medium via the inlet; separating the products from the liquid medium and forming nanopowders therefrom.

Other advantages and novel features will become more apparent from the following detailed description when taken in conjunction with the accompanying drawings, in which:

BRIEF DESCRIPTION OF THE DRAWINGS

Many aspects of the present apparatus and method for synthesizing nanopowders can be better understood with reference to the following drawings. The components in the drawings are not necessarily to scale, the emphasis instead being placed upon clearly illustrating the principles of the present apparatus and method. Moreover, in the drawings, like reference numerals designate corresponding parts throughout the several views.

The exemplifications set out herein illustrate at least one preferred embodiment, in one form, and such exemplifications are not to be construed as limiting the scope of the present apparatus and method for synthesizing nanopowders in any manner.

DETAILED DESCRIPTION OF PREFERRED EMBODIMENTS

Embodiments of the present invention will now be described in detail below and with reference to the drawings.

Figure 1:
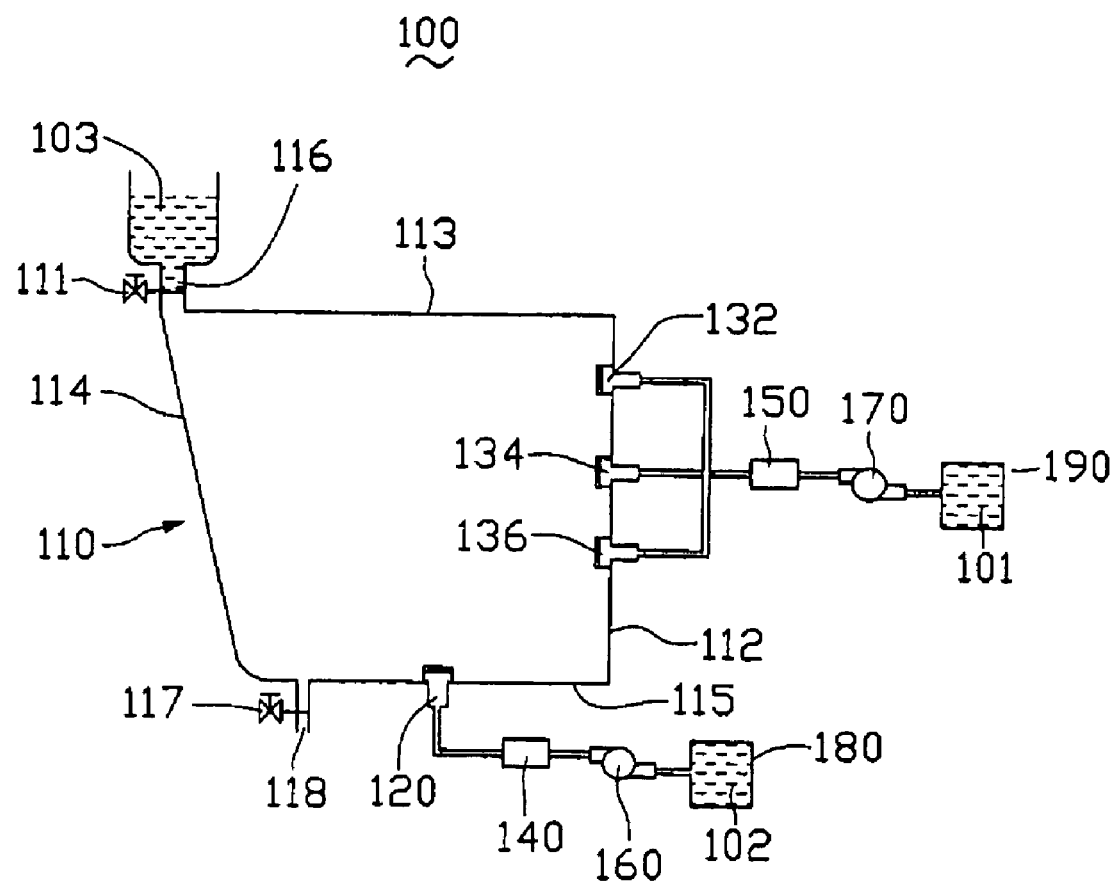
FIG. 1 is a schematic view of a nanopowder synthesis apparatus in accordance with a preferred embodiment.

Referring to FIG. 1, a nanopowder synthesis apparatus 100 according to a preferred embodiment is provided. The nanopowder synthesis apparatus 100 comprises a reaction chamber 110 having an inverted-trapezoid-shaped cross-section, three first sprayers 132, 134, 136 and a second sprayer 120. The reaction chamber 110 defines a top portion 113, a bottom portion 115 opposite to the top portion 113, and a first sidewall 112 and a second sidewall 114 adjoining the top portion 113 and the bottom portion 115. The first sprayers 132, 134 and 136 are formed in the first sidewall 112 configured for spraying a first liquid reactant 101 into the reaction chamber 110 therefrom. The second sprayer 120 is formed in the bottom portion 115 configured for spraying a second liquid reactant 102 into the reaction chamber 110 therefrom.

The first sprayers 132, 134 and 136 are coupled with a same container 190 via a flow controller 150 and a pump 170. The container 190 is configured for containing the first liquid reactant 101. The second sprayer 120 is coupled with a container 180 via a flow controller 140 and a pump 160. The container 180 is configured for containing the second liquid reactant 102. The reaction chamber 110 further comprises an inlet 116 and an outlet 118 near the second sidewall 114 and located in the top portion 113 and the bottom portion 115 respectively. The inlet 116 comprises a valve 111, and the outlet 118 comprises a valve 117. Preferably, the first sidewall 112 adjoining the top portion 113 and the bottom portion 115 perpendicularly, and the first sidewall 112 adjoining the top portion 113 and the bottom portion 115 obliquely.

In operation, the first and second reactants 101, 102 are pressurized and provided to the first sprayers 132, 134, 136 and the second sprayer 120 via the pumps 170 and 160 respectively. The first sprayers 132, 134, 136 and the second sprayer 120 atomize the provided first and second liquid reactants 101, 102 into fine drops and impinge with each other. Furthermore, fluxes, flow rates, and spraying swaths of the first and second reactants 101, 102 can be controlled by the flow controllers 150 and 140 respectively. Therefore, the first and second liquid reactants 101, 102 can react with each other substantially to form nanopowders. The inlet 116 is configured for injecting a liquid medium 103 into the reaction chamber 110 via the valve 111, to scour nanopowders (not shown) formed during reactions of the first and second liquid reactants to the outlet 118. The liquid medium 103 may be selected from group comprising water, ethanol, acetone, ether, chloroform, and ethyl acetate. The outlet 118 is configured for release the liquid medium 103 with the nanopowders suspended therein. The valve 117 is configured for controlling the volume of the liquid medium 103 with the nanopowders suspended therein.

It is noted that, in other embodiments, the first sprayers 132, 134 and 136 may each couples with a container via a pump and a flow controller respectively, and each container contains a different reactant. Therefore, a plurality of reactants can be used at the same time.

Figure 2:
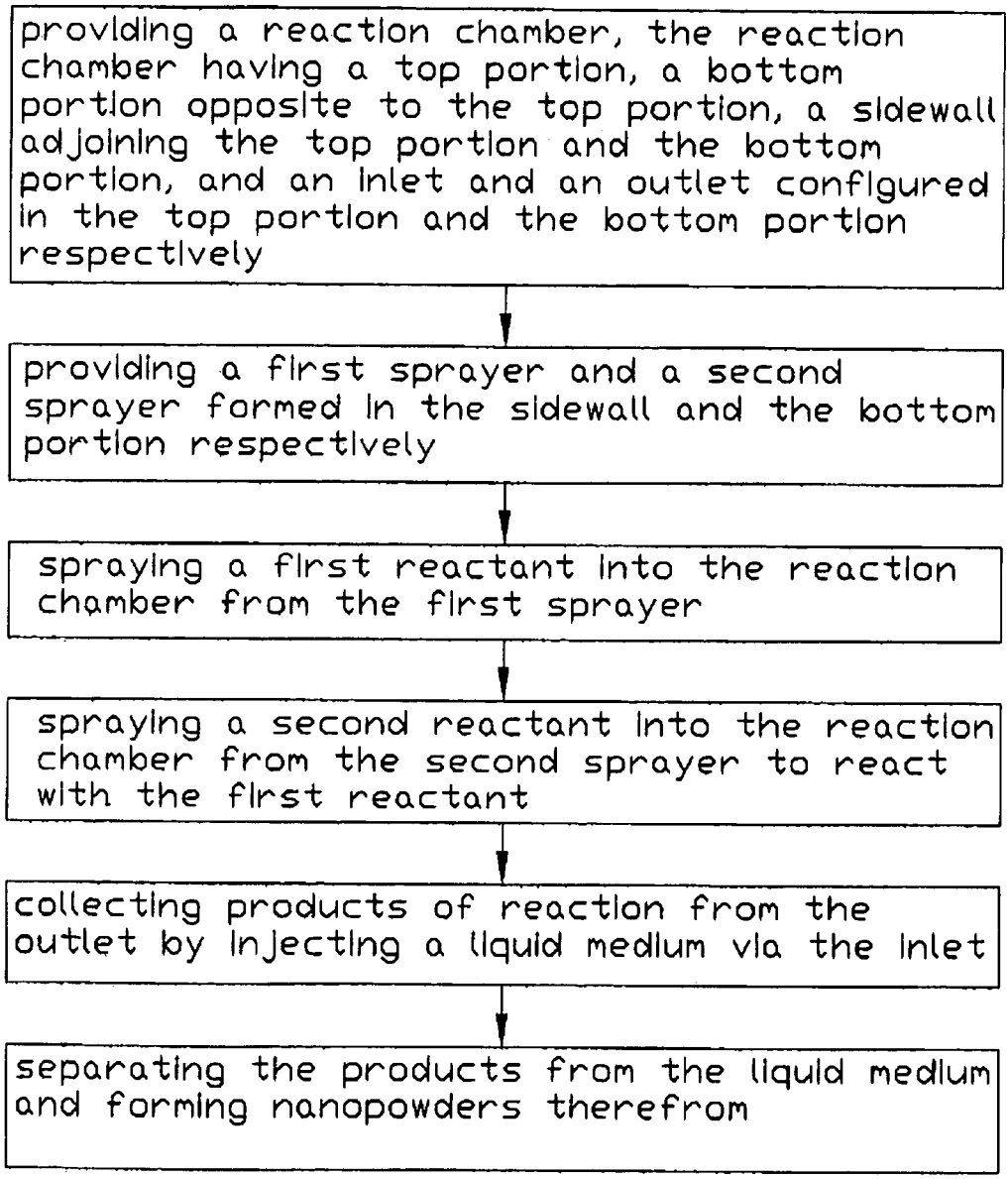
FIG. 2 is a schematic flow chart of a method for synthesizing nanopowders using the apparatus of FIG. 1.

Referring to FIG. 2, a nanopowder synthesis method according to another preferred embodiment is provided. The method comprises the steps of:

providing a reaction chamber, the reaction chamber having a top portion, a bottom portion opposite to the top portion, a sidewall adjoining the top portion and the bottom portion, and an inlet and an outlet configured in the top portion and the bottom portion respectively;

providing a first sprayer and a second sprayer formed in the sidewall and the bottom portion respectively;

spraying a first reactant into the reaction chamber from the first sprayer;

spraying a second reactant into the reaction chamber from the second sprayer to react with the first reactant;

collecting products of reaction from the outlet by injecting a liquid medium via the inlet;

separating the products from the liquid medium and forming nanopowders therefrom.

Referring to FIG. 1, the nanopowder synthesis method in accordance with the preferred embodiment is detail described below and by reference to examples.

EXAMPLE 1

A method for synthesizing metal nanopowders is provided. The method of example 1 comprises the steps of:

providing a reaction chamber 110 having an inverted-trapezoid-shaped cross-section, the reaction chamber 110 defines a top portion 113, a bottom portion 115 opposite to the top portion 113, a first sidewall 112 and a second sidewall 114 adjoining the top portion 113 and the bottom portion 115, and an inlet 116 and an outlet 118 configured in the top and the bottom portion respectively;

providing first sprayers 132, 134 and 136 formed in the first sidewall 112, and a second sprayer 120 formed in the bottom portion 115;

providing a container 190 coupled with the first sprayers 132, 134 and 136 through a pump 170 and a flow controller 150, and a container 180 coupled with the second sprayer 120 through a valve 160 and a flow controller 140, the container 190 is configured for containing a water solution of $M^{m+}$ (M denotes metals such as Ag, Au and etc., m=1, 2, or 3) ions as a first reactant 101, the container 180 is configured for containing a water solution of $BH_4^-$ (Borohydride Anion) anions as a second reactant 102;

operating the pump 170 and pressing the first reactant 101 into the first sprayers 132, 134 and 136 through the flow controller 150, and spraying the first reactant 101 into the reaction chamber 110 from the first sprayers 132, 134 and 136;

operating the pump 160 and pressing the second reactant 102 into the second sprayer 120 through the flow controller 140, and the second sprayer 120 spraying the second reactant 102 into the reaction chamber 110 from bottom to top to react with the first reactant 101, reaction of the sprayed first and second reactants 101, 102 can be shown as following reaction formula:

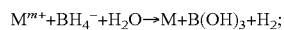

$$M^{m+} + BH_4^- + H_2O \rightarrow M + B(OH)_3 + H_2;$$

scouring metal nanopowders deposited on the second sidewall 114 to the outlet 118 by injecting pure water into the reaction chamber 110 as a liquid medium 103 via the inlet 116, and collecting the liquid medium 103 with the metal nanopowders suspended therein from the outlet 118 by opening the valve 117, of course, the liquid medium 103 with the metal nanopowders suspended therein may further includes the $M^{m+}$ ions and $BH_4^-$ anions;

separating the metal nanoparticles from the liquid medium 103 by filtering separation and calcining the metal nanopowders. The metal nanoparticles have an average grain size in the range from 80 nanometers to 150 nanometers.

EXAMPLE 2

A method for synthesizing $TiO_2$ (Titanium Dioxide) nanopowders is provided. The method of example 2 is similar to that of example 1. However, in example 2, the first reactant 101 employs a $TiCl_4$ (Titanium Tetrachloride) solution, the second reactant 102 employs excess ammonia water, the liquid medium 103 employs an ethanol solution. The separating step is performed by centrifugal separation employs a high-speed centrifugal separator, and separated $Ti(OH)_4$ (Titanium Hydroxide) from the mixture, and $TiO_2$ nanopowders are obtained by a calcining step for calcining the $Ti(OH)_4$. The $TiO_2$ nanoparticles have an average grain size in the range from 20 nanometers to 90 nanometers.

As stated above, the nanopowder synthesis apparatus and method in accordance with a preferred embodiment employs the second sprayer configured in the bottom portion of the reaction chamber, and the second sprayer spraying the second reactant into the reaction chamber from bottom to top. Therefore, reaction time of the second reactant and the first reactant spraying from the first sprayers is increased, the reactants can react substantially and be fully used. In addition, the sprayed reactants have high specific area and react with each other via high efficiency impact, liquid-liquid reaction on the micro level may carry through uniformly, and grain sizes of the nanopowders are very small.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A nanopowder synthesis apparatus comprising:
a reaction chamber, the reaction chamber having:
   a top portion;
   a bottom portion opposite to the top portion;
   a sidewall adjoining the top and the bottom portion;
   an inlet formed in the top portion configured for injecting a liquid medium; and
   an outlet formed in the bottom portion configured for releasing the liquid medium;
a first sprayer formed in the sidewall configured for spraying a first reactant into the reaction chamber therefrom; and
a second sprayer formed in the bottom portion configured for spraying a second reactant into the reaction chamber therefrom.

2. The nanopowder synthesis apparatus in accordance with claim 1, wherein the reaction chamber has an inverted-trapezoid-shaped cross-section.

3. The nanopowder synthesis apparatus in accordance with claim 2, wherein the sidewall is perpendicular to the top portion and the bottom portion.

4. The nanopowder synthesis apparatus in accordance with claim 1, wherein the inlet comprises a valve.

5. The nanopowder synthesis apparatus in accordance with claim 1, wherein the outlet comprises a valve.

6. A nanopowder synthesis method comprising the steps of:
providing a reaction chamber, the reaction chamber having a top portion, a bottom portion opposite to the top portion, a sidewall adjoining the top portion and the bottom portion, and an inlet and an outlet configured in the top portion and the bottom portion respectively;
providing a first sprayer and a second sprayer formed in the sidewall and the bottom portion respectively;
spraying a first reactant into the reaction chamber from the first sprayer;
spraying a second reactant into the reaction chamber from the second sprayer to react with the first reactant;
collecting products of reaction from the outlet by injecting a liquid medium via the inlet; and
separating the products from the liquid medium and forming nanopowders therefrom.

7. The nanopowder synthesis method in accordance with claim 6, wherein the liquid medium is selected from group comprising water, ethanol, acetone, ether, chloroform, and ethyl acetate.

8. The nanopowder synthesis method in accordance with claim 6, wherein the separating step is performed by filtering separation.

9. The nanopowder synthesis method in accordance with claim 6, wherein the separating step is performed by centrifugal separation.

10. The nanopowder synthesis method in accordance with claim 6, wherein the nanopowders have an average grain size in the range from 20 nanometers to 150 nanometers.

* * * * *

UNITED STATES PATENT AND TRADEMARK OFFICE
CERTIFICATE OF CORRECTION

PATENT NO. : 7,611,650 B2  Page 1 of 1
APPLICATION NO. : 11/432422
DATED : November 3, 2009
INVENTOR(S) : Ho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this

Twelfth Day of October, 2010

David J. Kappos
*Director of the United States Patent and Trademark Office*